United States Patent
Simeonov (10) Patent No.: US 11,549,362 B2
(45) Date of Patent: Jan. 10, 2023

(54) AZIMUTH DETERMINATION WHILE ROTATING

(71) Applicant: Halliburton Energy Services, Inc., Houston, TX (US)

(72) Inventor: Svetozar Dimitrov Simeonov, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 140 days.

(21) Appl. No.: 16/974,344

(22) Filed: Dec. 3, 2020

(65) Prior Publication Data
US 2021/0262339 A1   Aug. 26, 2021

Related U.S. Application Data (63) Continuation of application No. 16/465,954, filed as application No. PCT/US2017/066679 on Dec. 15, 2017, now Pat. No. 10,900,346.

(51) Int. Cl.
| | | |
|---|---|---|
| E21B 47/0228 | (2012.01) | |
| G01C 17/28 | (2006.01) | |
| G01C 17/38 | (2006.01) | |
| G01V 7/04 | (2006.01) | |
| E21B 7/04 | (2006.01) | |

(52) U.S. Cl.
CPC .......... *E21B 47/0228* (2020.05); *G01C 17/28* (2013.01); *G01C 17/38* (2013.01); *G01V 7/04* (2013.01); *E21B 7/04* (2013.01)

(58) Field of Classification Search
CPC ....... E21B 7/04; E21B 47/0228; G01C 17/28; G01C 17/38; G01V 7/04
See application file for complete search history.

(56) References Cited

U.S. PATENT DOCUMENTS

| | | |
|---|---|---|
| 4,813,274 A | 3/1989 | DiPersio et al. |
| 6,633,816 B2 | 10/2003 | Shirasaka et al. |
| 7,080,460 B2 | 7/2006 | Illfelder |
| 2005/0268476 A1 | 12/2005 | Illfelder |
| 2006/0106587 A1 | 5/2006 | Rodney |

(Continued)

FOREIGN PATENT DOCUMENTS

| | | |
|---|---|---|
| EP | 0857855 | 11/2002 |
| WO | 2010141364 | 12/2010 |

OTHER PUBLICATIONS

ISRWO International Search Report and Written Opinion for PCT/US2017/066679 dated Sep. 14, 2018.

*Primary Examiner* — Shane Bomar
(74) *Attorney, Agent, or Firm* — Benjamin Ford; C. Tumey Law Group PLLC (57) ABSTRACT

Systems and methods for determining azimuth of a wellbore while drilling. A method of drilling a wellbore that includes rotating a drill bit to extend the wellbore into a subterranean formation. The method may further include measuring magnetic toolface with a first magnetometer while rotating the drill bit. The method may further include obtaining a cross-axial magnetic field measurement. The method may further include determining azimuth at a point in the wellbore using at least the magnetic toolface and the cross-axial magnetic field measurement. The method may further include using the azimuth as feedback in the drilling the wellbore.

20 Claims, 5 Drawing Sheets

(56) References Cited

U.S. PATENT DOCUMENTS

| | | | |
|---|---|---|---|
| 2011/0196612 A1* | 8/2011 | Bonavides | G01V 11/005 |
| | | | 702/6 |
| 2013/0151158 A1 | 6/2013 | Brooks et al. | |
| 2014/0163888 A1 | 6/2014 | Bowler et al. | |
| 2014/0367170 A1 | 12/2014 | Hoehn et al. | |
| 2015/0331138 A1* | 11/2015 | Estes | G01V 7/04 |
| | | | 324/346 |
| 2016/0145997 A1 | 5/2016 | Van Steenwyk et al. | |
| 2016/0160628 A1* | 6/2016 | Sugiura | E21B 7/06 |
| | | | 700/275 |
| 2017/0198525 A1 | 7/2017 | Feddema et al. | |
| 2018/0045850 A1* | 2/2018 | Smidth | G01V 11/00 |
| 2018/0298743 A1* | 10/2018 | Sullivan | E21B 47/024 |
| 2019/0106982 A1* | 4/2019 | Willerth | E21B 47/024 |
| 2019/0353023 A1* | 11/2019 | Whitacre | E21B 7/06 |
| 2021/0254448 A1* | 8/2021 | Phillips | E21B 47/022 |
| 2022/0186607 A1* | 6/2022 | Ledroz | E21B 47/092 |

\* cited by examiner

AZIMUTH DETERMINATION WHILE ROTATING

BACKGROUND

Wellbores drilled into subterranean formations may enable recovery of desirable fluids (e.g., hydrocarbons) using a number of different techniques. While drilling the wellbore, it is important to monitor the direction of the wellbore. Accordingly, measurements are often taken during the drilling operation to determine the orientation of the wellbore. These measurements are commonly referred to as surveying and include determination of the inclination and azimuth of the wellbore with respect to the earth's gravity and magnetic fields. Azimuth is the angle between the vertical projection of a wellbore trajectory onto a horizontal surface and true north or magnetic north measured in a horizontal plane. Inclination is the deviation of the wellbore from vertical.

To enable these measurements, a survey instrument may commonly be installed in the bottomhole assembly. The survey instrument may include a number of different sensors, including three-axis accelerometers and three-axis magnetometers. The three-axis accelerometer may measure the Earth's gravitational field vector relative to the survey instrument longitudinal axis. The three-axis accelerometer may also measure gravity (high side) "toolface angle," which is the angle of the borehole survey instrument within the wellbore measured clockwise relative to up (high side) and in the plane perpendicular to the wellbore axis. The three-axis magnetometer may measure the Earth's magnetic field vector. From these measurements, the azimuth, inclination, and magnetic toolface may be determined. Magnetic toolface is the angle of the borehole survey instrument within the wellbore measured clockwise relative to magnetic north and in the plane perpendicular to the wellbore axis.

While survey instruments may be used to determine wellbore orientation, their use while actively drilling may be limited. For example, measurements obtained while the bottomhole assembly is rotating may be inaccurate, for example, due to the stress encountered from drilling the wellbore, thus leading to unreliable determination of wellbore orientation, including azimuth. Accordingly, surveys are often performed at fixed survey points in the wellbore so that intermittent measurements of the Earth's magnetic and gravitational fields are obtained under static conditions, i.e., while the bottomhole assembly is stationary. However, undetected variations in wellbore trajectory between the survey points may be undetected, thus leading to undesirable error in depth and position of the wellbore due to inaccurate steering of the bottomhole assembly.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to wellbore surveys. More particularly, this disclosure may describe methods and systems for determining azimuth of a wellbore while drilling. By determination of the azimuth while drilling (i.e., rotating the bottomhole assembly), trajectory of the wellbore may be known between survey points, thus enabling adjustments to the drilling operation. For example, the azimuth determined while rotating may be used as feedback to the drilling operation to better enable maintenance of a desired wellbore trajectory. Techniques disclosed herein may use measurements of magnetic toolface from a magnetometer while rotating to determine azimuth at the magnetometer. By way of example, magnetic toolface measurements from the magnetometer together with cross-axial magnetic field measurements (Boxy) from another magnetometer may be used in the determination of the magnetic field vectors (Bx, By, Bz) that may then be used with the gravity vectors (Gx, Gy, Gz) to determine azimuth. This method may be beneficial as direct measurements of the magnetic field vectors while rotating can be unreliable, leading to errors in the azimuth determination.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
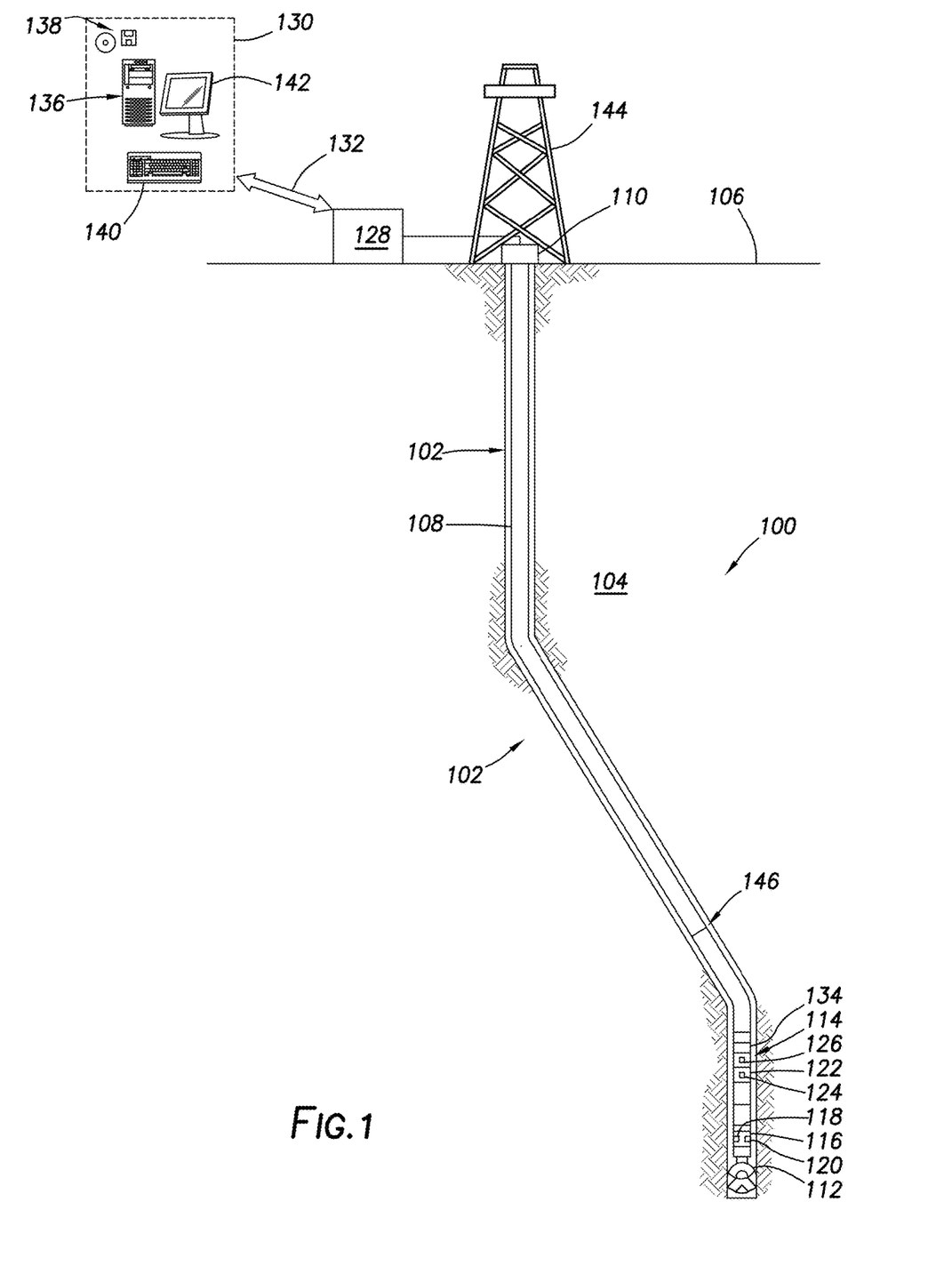
FIG. 1 is a schematic illustration of an example drilling assembly

FIG. 1 illustrates a drilling system 100. As illustrated, wellbore 102 may extend into subterranean formation 104 from surface 106. Generally, wellbore 102 may include horizontal, vertical, slanted, curved, and other types of wellbore geometries and orientations. Additionally, while wellbore 102 is illustrated as being land-based, it should be understood that the present techniques may also be applicable in offshore applications. Wellbore 102 may be cased or uncased. In examples, a drill string 108 may begin at wellhead. 110 and traverse wellbore 102. A drill bit 112 may be attached to a distal end of drill string 108 and may be driven, for example, either by a downhole motor and/or via rotation of drill string 108, for example, from surface 106. While FIG. 1 illustrates drill bit 112 in wellbore 102 extending from surface 106, it should be understand that the present techniques may also be applicable in multi-lateral or other configurations where a lateral wellbore branches from a main wellbore. Drill bit 112 may be a part of bottomhole assembly 114 at distal end of drill string 108. While not illustrated, bottomhole assembly 114 may further comprise one or more of a mud motor, power module, telemetry subassembly, and/or other sensors and instrumentation as will be appreciated by those of ordinary skill in the art. As will be appreciated by those of ordinary skill in the art, bottomhole assembly 114 may be a measurement-while drilling (MWD) or logging-while-drilling (LWD) system.

Drilling system 100 may include a steering module 116 on bottomhole assembly 114. Steering module 116 may include specialized equipment to steer drill bit 112 as it penetrates subterranean formation 104. Non-limiting examples of equipment that may be present in steering module 116 may include pads for pushing, an internal sleeve for pivoting in response to pressure (e.g., pushing from the pads) to change drill bit 112 direction, including, but not limited to, actuators and push pad, among others. Steering module may also include various sensors, such as first magnetometer 118 and accelerometer 120. First magnetometer 118 may be a two-axis magnetometer 118 or other suitable magnetometer for determining magnetic toolface angle on the drilling string 112. Accelerometer 120 may be a three-axis accelerometer or other suitable accelerometer for determining one or more gravity vectors. The magnetic toolface angle determined by first magnetometer 118 may be used in determining azimuth, which may then be used as feedback in the drilling operation. Accordingly, it may be desired to for first magnetometer 118 to be located proximate drill bit 112. The distance of the first magnetometer 188 from drill bit 112 may have based on a number of factors, such as tool size, bit type, etc. Because first magnetometer 118 may be located proximate drill bit 112, it may be referred to as a local magnetometer. While first magnetometer 118 and accelerometer 120 may be located on steering module 116, these sensors may be located at other locations on bottomhole assembly 114 or drill bit 112, for example, where it is desired to determine magnetic toolface angle and gravity vectors. In other words, the first magnetometer 118 and accelerometer 120 are not required to be located on steering module 116, even though such placement may be desired in some instances to determine azimuth at steering module 116.

Drilling system 100 may include survey tool 122 on bottomhole assembly 114. Survey tool 122 may include a variety of devices and sensors for determining position of bottomhole assembly 114, such as second magnetometer 124 and one or more additional sensors 126, such as an accelerometer. As previously described, periodic surveys may be performed with the survey tool 122 to determine orientation of bottomhole assembly 114, including azimuth and inclination, while the bottomhole assembly 114 is not rotating. Second magnetometer 124 may be of a higher accuracy than first magnetometer 118 as it will be providing magnetic field vectors used in determining orientation. First magnetometer 118 can be less accurate as it will be providing magnetic toolface, which can be accurately calculated with simple, non-calibrated magnetometers that may be less expensive than the survey grade magnetometers typically used for second magnetometer 124 in survey tool 122. First magnetometer 118 may be a non-calibrated magnetometer, such as a MEMs magnetometer or other magnetometer that may typically be found in automobiles or other commercial electronics that is calibrated while rotating. These lower costs magnetometers that may be used as first magnetometer 118 can have a higher dynamic range than the higher cost magnetometers used as second magnetometer 124 in survey tool 122.

Any suitable technique may be used for transmitting signals from bottomhole assembly 114, including first magnetometer 118, second magnetometer 124, and accelerometer 120, to surface 106, including, but not limited to, wired pipe telemetry, mud-pulse telemetry, acoustic telemetry, and electromagnetic telemetry. While not illustrated, bottomhole assembly 114 may include a telemetry subassembly that may transmit telemetry data to the surface. A transmitter in the telemetry subassembly may be operable to generate pressure pulses in the drilling fluid that propagate along the fluid stream to surface 106. At surface 106, pressure transducers (not shown) may convert the pressure signal into electrical signals for a digitizer 128. Digitizer 128 may supply a digital form of the telemetry signals to information handling system 130 via a communication link 132, which may be a wired or wireless link. The telemetry data may be analyzed and processed by information handling system 130. For example, the telemetry data could be processed to determine orientation of bottomhole assembly 114.

Additionally, bottomhole assembly 114 may be connected to and/or controlled by information handling system 130, which may be disposed on surface 106. In examples, information handling system 130 may communicate with EM ranging tool 124 through a communication line (not illustrated) disposed in (or on) drill string 108 or through other suitable communication protocol, such as mud pulse telemetry or wireless communication. Information handling system 130 may transmit information to bottomhole assembly 114 and may receive as well as process information recorded by bottomhole assembly 114. In addition, bottomhole assembly 114 may include a downhole information handling system 134, which may also be disposed on bottomhole assembly 114. Downhole information handling system 134 may include, a microprocessor or other suitable circuitry, for estimating, receiving and processing signals received by components of bottomhole assembly 114, such as first magnetometer 118, second magnetometer 124, and accelerometer 120, so that orientation data, such as inclination or azimuth, may be transmitted to surface 106. Downhole information handling system 134 may further include additional components, such as memory, input/output devices, interfaces, and the like. While not illustrated, first magnetometer 118, second magnetometer 124, and accelerometer 120 may include one or more additional components, such as analog-to-digital converter, filter and amplifier, among others, that may be used to process (e.g., in whole or part) the measurements on bottomhole assembly 114, such as by first magnetometer 118, second magnetometer 124, and accelerometer 120, before they may be transmitted to surface 106. Alternatively, raw measurements may be transmitted to surface 106.

Information handling system 130 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 130 may be a personal computer, a network storage device, or any other suitable device and may vary in size, shape, performance, functionality, and price. Information handling system 130 may include a processing unit 136 (e.g., microprocessor, central processing unit, etc.) that may process data by executing software or instructions obtained from a local or remove non-transitory computer readable media 138 (e.g., optical disks, magnetic disks). Non-transitory computer readable media 138 may store software or instructions of the methods described herein. Non-transitory computer readable media 138 may include any instrumentality or aggregation of instrumentalities that may retain data and/or instructions for a period of time. Non-transitory computer readable media 138 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 130 may also include input device(s) 140 (e.g., keyboard, mouse, touchpad, etc.) and output device(s) 142 (e.g., monitor, printer, etc.). Input device(s) 140 and output device(s) 142 provide a user interface that enables an operator to interact with bottomhole assembly 113 (or a specific component thereof) and/or software executed by processing unit 136. For example, information handling system 130 may enable an operator to select analysis options, view collected data, view analysis results, and/or perform other tasks.

In certain systems and methods, the drilling system 100 may not be on dry land, as shown in FIG. 1, but may be on a wetland or at sea. In such an environment, the derrick 144 (or another piece of equipment that performs the function of derrick 144) may be located on a drilling platform (not shown), such as a semi-submersible drilling rig, a drill ship, or a jack-up drilling rig. While not shown, drill string 108 may extend from derrick 105 through the water, to the sea floor, and into the subterranean formation 104.

With continued reference to FIG. 1, a method for drilling will now be described in accordance with example embodiments. As illustrated on FIG. 1, drill bit 112 may be used to extend wellbore 102 into subterranean formation 104, for example, by rotation of drill bit 112. To determination location of drill bit 112, surveys may be taken periodically in wellbore 102. The survey may include stopping drilling, including stopping rotation of drill bit 112, and then taking measurements with survey tool 122 to determine location, including inclination. As illustrated, a survey may be performed in wellbore 102 at survey point 146. Drilling may then be continued until another survey point is reached. However, it may be desirable to determine azimuth after survey point 146 while drilling. To determine azimuth while rotating measurements of magnetic toolface, gravity vectors, and cross-axial magnetic field measurements may be used in determining azimuth. First magnetometer 118 may be used to measure magnetic toolface while the gravity vectors (Gx, Gy, Gz) and cross-axial magnetic field measurements (Boxy) may be measured using accelerometer 120 and second magnetometer 124. The cross-axial magnetic field measurements (Boxy) and magnetic toolface may be used to determine the magnetic vector in the x direction (Bx) and the magnetic vector in the y direction (By). The Earth's total magnetic field strength (Btotal), cross-axial magnetic field measurements (Boxy), and the Earth's local magnetic dip angle ($\theta$) may be used to calculate the z component of the magnetic field (Bz). With the magnetic field vectors (Bx, By, and Bz) and gravity vectors (Gx, Gy, and Gz), the azimuth may be determined. Accordingly, the azimuth may be determined while rotating. This azimuth determination may be made without measurements of the magnetic field vectors while rotating, which may be unreliable.

Figure 2:
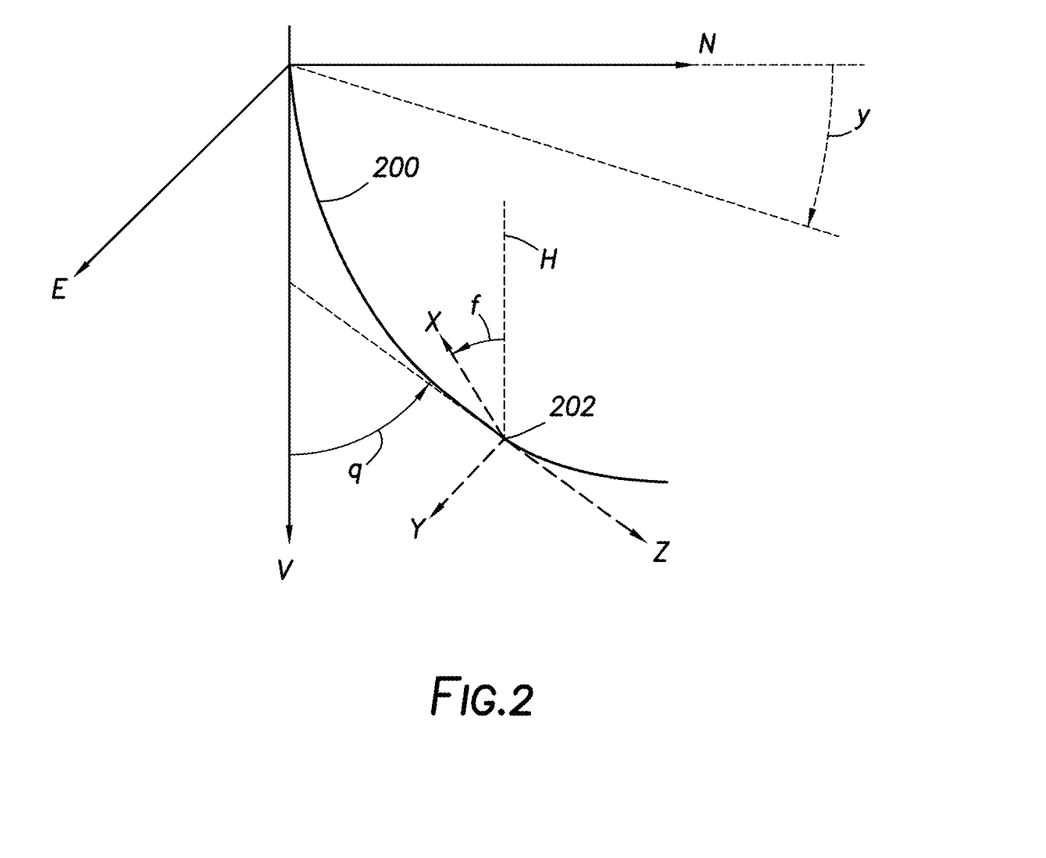
FIG. 2 is a schematic illustration of a wellbore illustrating relationship between tool coordinates, toolface angle, inclination, and azimuth.

FIG. 2 is a schematic illustration of a wellbore illustrating relationship between tool coordinates (x,y,z), toolface angle (f), inclination (q), and azimuth (y). The Earth's coordinates are provided on FIG. 2 as North (N), South (S), and Vertical (V). Wellbore trajectory 200 with respect to the Earth's coordinates (N,S,V) are also shown on FIG. 2. Tool location is provided at reference number 202. Any suitable tool may be provided at tool location 202, including without limitation, bottomhole assembly 114 (e.g., shown on FIG. 1), drill bit 112 (e.g., shown on FIG. 1), survey tool 122 (e.g., shown on FIG. 1), or sensors (e.g., accelerometer 120, first magnetometer 118, or second magnetometer 124 shown on FIG. 1). Tool coordinates are also provided on FIG. 2 as X, Y, and Z. Toolface angle (f) is shown as the angle between the high side H of wellbore trajectory 200 and the x-axis, wherein the x-axis is the fixed point defined for toolface determination. The inclination of wellbore trajectory 200 at tool location 202 is provided as q, wherein inclination (q) is the deviation of the wellbore from vertical V. The azimuth is provided on FIG. 2 as A, wherein azimuth is the angle between the intersection of a vertical plane containing a tangent to the wellbore trajectory 200 and north N.

Figure 3:
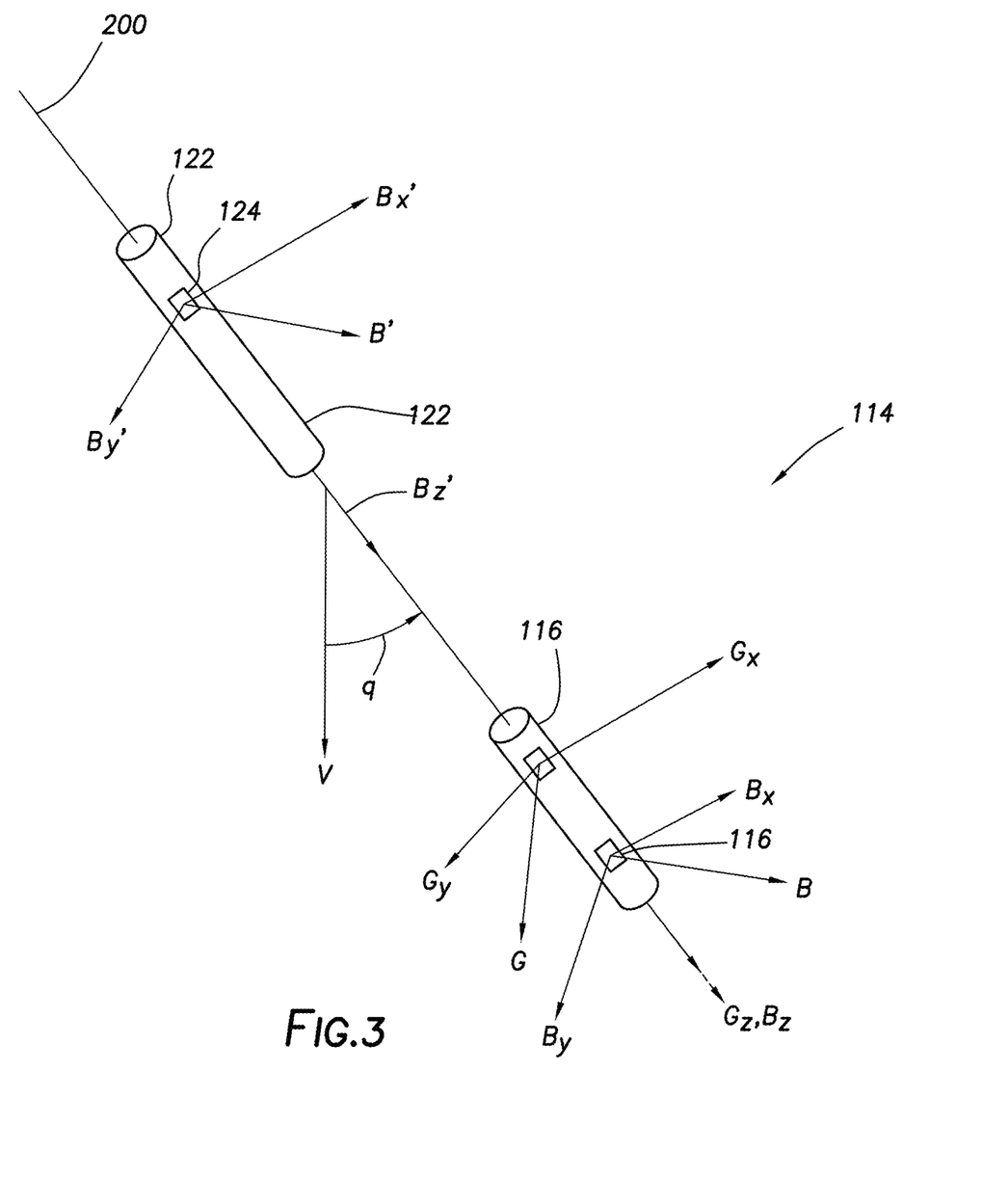
FIG. 3 is a schematic illustration of a portion of bottomhole assembly showing magnetic field and gravity vectors.

FIG. 3 is a schematic illustration of a portion of bottomhole assembly 114 showing magnetic field vectors (Bx, By, Bz, Bx', By', and Bz') and gravity vectors (Gx, Gy, Gz). As illustrated, survey tool 122 and steering module 116 may be positioned along wellbore trajectory 200. Steering module 116 may include first magnetometer 118 and accelerometer 120. First magnetometer 118 may measure magnetic field vectors (Bx, By, and Bz) of magnetic field (B) at first magnetometer. Accelerometer 120 may measure gravity vectors (Gx, Gy, and Gz) at accelerometer 120. Survey tool 122 may include second magnetometer 124. Second magnetometer 124 may measure magnetic field vectors (Bx', By', and Bz') at second magnetometer 124.

Figure 4A:
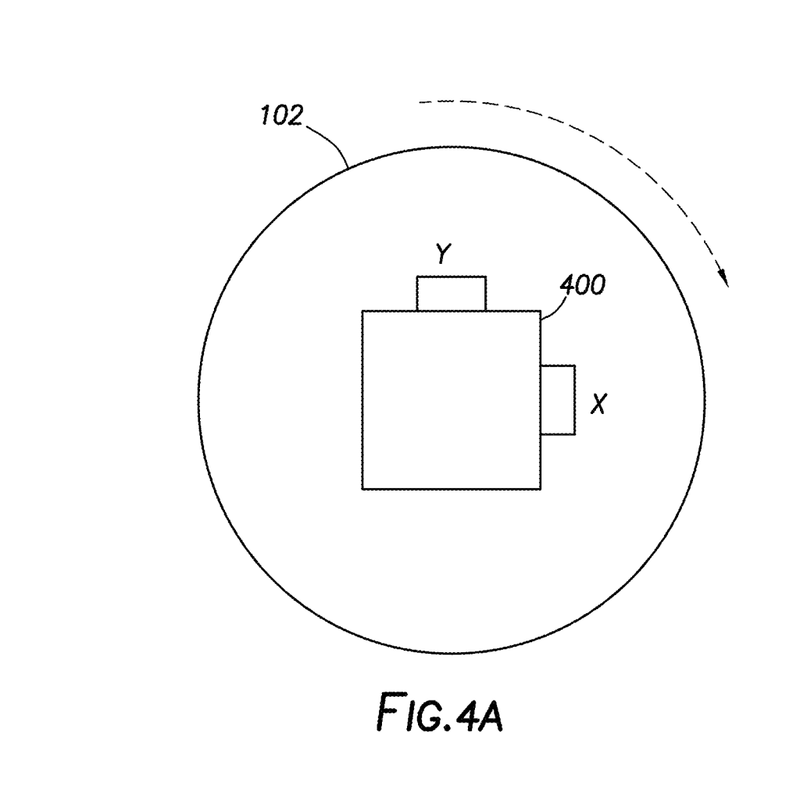
FIGS. 4A and 4B illustrate magnetometer rotation in a wellbore.
Figure 4B:
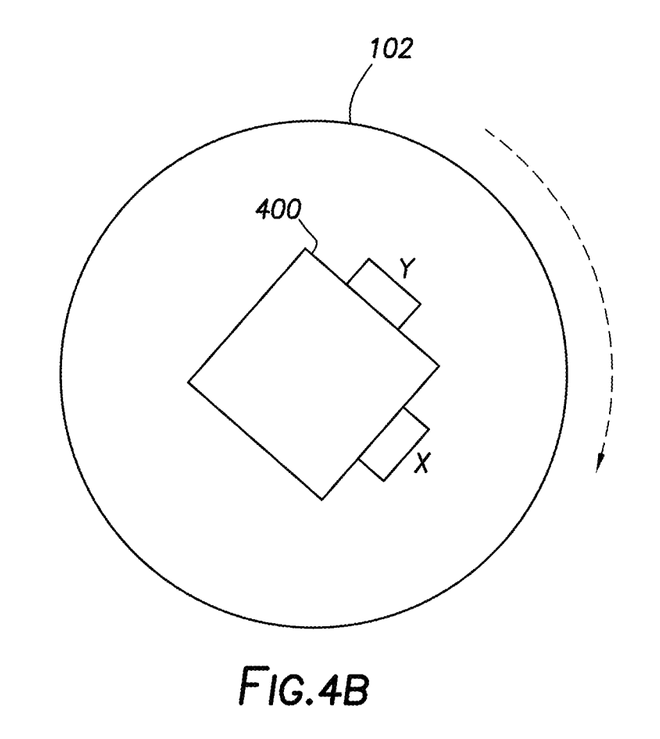

FIGS. 4A and 4B illustrate magnetometer rotation in wellbore 102. As illustrated, magnetometer 400 may be disposed in wellbore 102. Magnetometer 400 may be first magnetometer 118 (e.g., FIG. 1) or second magnetometer 124 (e.g., FIG. 1). During drilling of wellbore 102, magnetometer 400 may rotate in wellbore 102. As illustrated on FIGS. 4A and 4B, magnetometer 400 may rotate from a first position (FIG. 4A) to a second position (FIG. 4B).

Due to rotation in wellbore 102 and relative stresses from drilling, measurement of magnetic field vectors may be unreliable while rotating. Thus, as previously described, orientation is usually determined at various survey points (e.g., survey point 146 on FIG. 1) while static in the wellbore 102. However, it may be desired to determine orientation while drilling so that adjustments can be made between survey points should wellbore trajectory 200 deviate from a desired. Of the different measurements of orientation, azimuth is one measurement that may be desired.

Azimuth (A) of bottomhole assembly 114 may be determined at first magnetometer 118 as follows:

$$A = \tan^{-1}\left(\frac{(Gx*By - Gy*Bx)*Gt}{Bz*(Gx^2 + Gy^2) - Gz*(Gx*Bx + Gy*By)}\right) \quad (1)$$

wherein Bx, By, and Bz refer are the magnetic field vectors and Gx, Gy, and Gz are the gravity vectors. While the gravity vectors (Gx, Gy, and Gz) may be measured while rotating, for example, using accelerometer 120, the magnetic field vectors (Bx, By, and Bz) measures taken while rotating are typically unreliable so cannot be used in the determination of azimuth (A). Accelerometer 120 may be positioned at any suitable location with respect to first magnetometer 118, including but not limited to, being spaced from about 4 inches (10 cm) to about 12 inches (30 cm), or more particular, from about 6 inches (15 cm) to about 8 inches (20 cm) from the first magnetometer 118.

The cross-axial magnetic field measurements (Boxy) from the second magnetometer 124 and the magnetic toolface (α) from the first magnetometer 118 may then be used to determine the magnetic vector in the x direction (Bx) and the magnetic vector in the y direction (By) at the first magnetometer 118. The relationship between the cross-axial magnetic field measurements (Boxy) and magnetic toolface (α) may be provided, as follows:

$$Bx = Boxy * \cos(\alpha) \quad (2)$$

$$By = Boxy * \sin(\alpha) \quad (3)$$

Accordingly, equations (2) and (3) may be substituted into equation (1) to provide the following equations for azimuth (A):

$$A = \tan^{-1}\left(\frac{Boxy*((Gx*\sin(\alpha) - Gy*\cos(\alpha))*Gt}{Bz*(Gx^2 + Gy^2) - Boxy*Gz*(Gx*\cos(\alpha) + Gy*\sin(\alpha))}\right) \quad (4)$$

$$A = \tan^{-1}\left(\frac{((Gx*\sin(\alpha) - Gy*\cos(\alpha))*Gt}{\frac{Bz}{Boxy}*(Gx^2 + Gy^2) - Gz*(Gx*\cos(\alpha) + Gy*\sin(\alpha))}\right) \quad (5)$$

To solve for azimuth (A), the magnetic vector in the z direction is needed. The Earth's total magnetic field (Bt) may be used to determine the magnetic vector in the z direction. The earth's total magnetic field (Bt) may be provided in Tesla's and may be known or provided by the second magnetometer 124. The relationship between the Earth's total magnetic field (Bt) and the magnetic field vectors (Bx, By, Bz) may be provided as follows:

$$Bt = \sqrt{Bx^2 + By^2 + Bz^2} \quad (6)$$

In equation (5), the only unknown is Bz/Boxy. However, using the relationship between the magnetic field vectors (Bx, By, Bz) and the Earth's total magnetic field (Bt), Bz/Boxy may be provided as follows:

$$\sin\Phi \frac{Bz}{Boxy} = \frac{\sqrt{Bt^2 - Boxy^2}}{Boxy} = \sqrt{\left(\frac{Bt}{Boxy}\right)^2 - 1} \quad (7)$$

wherein θ is the Earth's local magnetic dip angle. The Earth's local magnetic dip angle (θ) should generally be constant while drilling the wellbore 102 and may be provided using any suitable technique. Non-limiting techniques for determining Earth's local magnetic dip angle (θ) may include, but are not limited, software calculators or web-based calculators, including those based on the World Magnetic Model or International Geomagnetic Reference Field.

While the magnetic vector in the z direction (Bz) may be determined using equation (7), due to the square root function, the sign the magnetic vector in the z direction (Bz) cannot be resolved. To resolve the ambiguity for the sign the magnetic vector in the z direction (Bz), the sine of the Earth's local magnetic dip angle (θ) may be used. The Earth's local magnetic dip angle (θ) (or the sine thereof) may be downloaded, for example, to the bottomhole assembly 114 prior to the trip into the wellbore 102. The sine of the Earth's local magnetic dip angle (θ) may be calculated with the following equations for both positive magnetic vector in the z direction+|Bz| and the negative magnetic vector in the z direction−|Bz|. A closer match between equations (8) and (9) for the sine of the Earth's local magnetic dip angle (θ) will determine the correct sign for the magnetic vector in the z direction (Bz).

$$\sin(\theta)'_1 = \frac{Gx*Boxy*\cos(\alpha) + Gy*Boxy*\sin(\alpha) + Bz*Gz}{Gt*Bt} \quad (8)$$

$$\sin(\theta)'_2 = \frac{Gx*Boxy*\cos(\alpha) + Gy*Boxy*\sin(\alpha) - Bz*Gz}{Gt*Bt} \quad (9)$$

where $\sin(\theta)'_1$ is the Earth's magnetic dip angle determined while rotating using the positive magnetic vector in the z direction+|Bz| and $\sin(\theta)'_2$ is the Earth's magnetic dip angle determined while rotating using the negative magnetic vector in the z direction−|Bz|.

The previous description of azimuth determination describes using the cross-axial magnetic field measurements (Boxy) from second magnetometer 124 while drilling. However, during drilling the cross-axial magnetic field measurements between the first magnetometer 118 and the second magnetometer 124 may be used to calibrate the cross-axial magnetic field measurements as follows:

$$BoxyRatio = \frac{B'oxy}{\sqrt{X'mag^2 + Y'mag^2}} \quad (10)$$

Wherein B'oxy is measured by the second magnetometer 124 during a survey while static (e.g., at survey point 146 on FIG. 1), X'mag is magnitude of the magnetic field in the x-direction, Y'mag is magnitude of the magnetic field in the y-direction, X'mag and Y'mag are measured by the first magnetometer 118 during a survey while static (e.g., at survey point 146 on FIG. 1). Accordingly, during drilling the calibrated cross-axial magnetic field measurements (B"oxy) may be calculated as follows:

$$B"oxy = BoxyRatio * \sqrt{Xmag^2 + Ymag^2} \quad (11)$$

Wherein Xmag is magnitude of the magnetic field in the x-direction, Ymag is magnitude of the magnetic field in the y-direction, and are measured by the first magnetometer 118 during drilling while rotating. The calibrated cross-axial magnetic field measurements (B"oxy) may then be used in the determination of azimuth (A) in place of the Boxy measurements taken by the second magnetometer 124 while drilling, for example, the calibrated cross-axial magnetic field measurements (B"oxy) may be used in equations (2) to (5) and (7) to (9).

Figure 5:
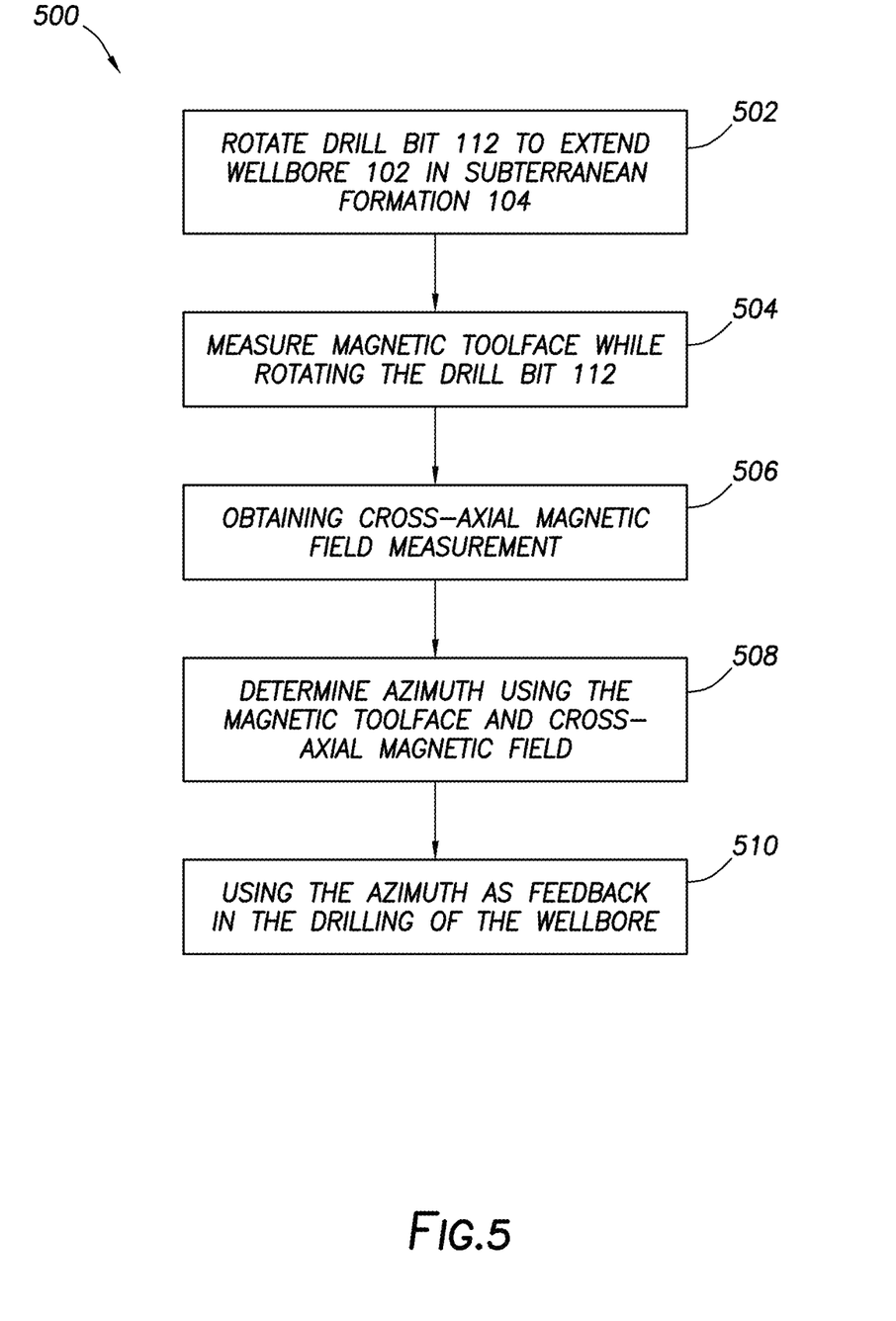
FIG. 5 is a flow chart illustrating an example method for calculating azimuth.

FIG. 5 flow chart that illustrates a method 500 of drilling that includes azimuth determination while rotating. In block 502, drill bit 112 may be rotated to extend wellbore 102 in subterranean formation 104. As previously described it may be desired to determine azimuth will rotating drill bit 112. By determining azimuth while rotating, adjusting to trajectory of wellbore 102 may be made between survey points. In block 504, magnetic toolface may be measured while rotating drill bit 112. Magnetic toolface may be measured with a magnetometer (e.g., first magnetometer 118 on FIG. 1). The magnetometer may be a three-axis magnetometer. In block 506, a cross-axial magnetic field measurement may be obtained. The cross-axial magnetic field measurement (Boxy) may be obtained by measuring the cross-axial magnetic field with a magnetometer (e.g., second magnetometer 124 on FIG. 1). The measurement may be performed while rotating drill bit 112. Alternatively, the cross-axial magnetic field measurement (Boxy) may be obtained by calculating a calibrated cross-axial magnetic field measurement (B"oxy). A technique for calculating a calibrated cross-axial magnetic field measurement (B"oxy) that may be used with method 500 is described above with respect to Equations 10 and 11. In block 508, azimuth may be determined using the magnetic toolface and cross-axial magnetic field measurement (Boxy). An example technique for azimuth determination that may be used with method 500 is described above with respect to Equations 1 to 9. In block 510, the azimuth is used as feedback in the drilling of wellbore 102. For example, the drilling of wellbore 102 may use the azimuth as feedback such that one or more parameters of the drilling may be modified to maintained a desired trajectory (or modify a trajectory) of wellbore 102. Non-limiting examples of the parameters may include, but are not limited to, weight on bit, amount of bit deflection, and angle of bit deflection, among others.

As will be appreciated, the previously disclosed techniques may be used in a wide variety of methods and systems. The systems and methods may further be characterized by one or more of the following statements:

Statement 1: A method of drilling a wellbore, comprising: rotating a drill bit to extend the wellbore into a subterranean formation; measuring magnetic toolface with a first magnetometer while rotating the drill bit; obtaining a cross-axial magnetic field measurement; determining azimuth at a point in the wellbore using at least the magnetic toolface and the cross-axial magnetic field measurement; and using the azimuth as feedback in the drilling the wellbore.

Statement 2: The method of statement 1, wherein the obtaining the cross-axial magnetic field measurement comprises measuring cross-axial magnetic field with a second magnetometer while rotating the drill bit.

Statement 3: The method of statement 1 or statement 2, wherein the obtaining the cross-axial magnetic field measurement comprises determining a calibrated cross-axial magnetic field measurement using a measurement of a cross-axial magnetic field while static from a second magnetometer and magnitude of x- and y-components of a magnetic field as measured by the first magnetometer and the second magnetometer while static.

Statement 4: The method of any preceding statement, wherein the point is at the first magnetometer.

Statement 5: The method of any preceding statement further comprising obtaining measurements of gravity vectors with an accelerometer.

Statement 6: The method of any preceding statement, wherein the determining the azimuth at the point in the wellbore comprises obtaining gravity vectors, calculating an x component of a magnetic field based on the magnetic toolface and the cross-axial magnetic field measurement, calculating a y component of the magnetic field based on the magnetic toolface and the cross-axial magnetic field measurement, calculating a z component of the magnetic field based on Earth's total magnetic field, the cross-axial magnetic field measurement, and Earth's local magnetic dip angle, and then calculating azimuth using the gravity vectors, the x component of the magnetic field, the y component of the magnetic field, and the z component of the magnetic field.

Statement 7: The method of any preceding statement, wherein the determining the azimuth at the point in the wellbore uses equation (1).

Statement 8: The method of any preceding statement, wherein the cross-axial magnetic field measurement is obtained with a second magnetometer on a survey tool.

Statement 9: The method of any preceding statement, wherein the determining the azimuth is performed downhole, at surface of the wellbore, or a combination thereof.

Statement 10: A method of drilling a wellbore, comprising: rotating a drill bit to extend the wellbore into a subterranean formation; measuring magnetic toolface with a first magnetometer while rotating the drill bit; obtaining a cross-axial magnetic field measurement with a second magnetometer; measuring gravity with an accelerometer to obtain gravity vectors; determining azimuth at a point in the wellbore using at least the magnetic toolface and the cross-axial magnetic field measurement, wherein determining the azimuth at the point in the wellbore uses equation (1); using the azimuth as feedback in the drilling the wellbore.

Statement 11: The method of statement 10, wherein the obtaining the cross-axial magnetic field measurement comprises measuring cross-axial magnetic field with the second magnetometer while rotating the drill bit.

Statement 12: The method of statement 10 or statement 11, wherein the obtaining the cross-axial magnetic field measurement comprises determining a calibrated cross-axial magnetic field measurement using a measurement of a cross-axial magnetic field while static from the second magnetometer and magnitude of x- and y-components of a magnetic field as measured by the first magnetometer and the second magnetometer while static.

Statement 13: The method of any one of statements 10 to 12, wherein the point is at the first magnetometer.

Statement 14: The method of any one of statements 10 to 13, wherein the first magnetometer and the second magnetometer are on a survey tool.

Statement 15: The method of any one of statements 10 to 14, wherein the determining the azimuth is performed downhole, at surface of the wellbore, or a combination thereof.

Statement 16: A system for determining azimuth while drilling a wellbore comprising: a bottomhole assembly disposed in the wellbore comprising: a drill bit; a first magnetometer for measuring magnetic toolface while drilling; a second magnetometer for measuring cross-axial magnetic field; an accelerometer for measuring acceleration to obtain gravity vectors; and an information handling system operable to determine azimuth at a point in the wellbore using at least the magnetic toolface and the measurement of the cross-axial magnetic field.

Statement 17: The system of statement 16, wherein the information handing system is operable to determine a calibrated cross-axial magnetic field measurement using the measurement of the cross-axial magnetic field from the second magnetometer and magnitude of x- and y-components of a magnetic field as measured by the first magnetometer and the second magnetometer while static.

Statement 18: The system of statement 16 or statement 17, wherein the point in the wellbore is at the first magnetometer.

Statement 19: The system of any one of statements 16 to 18, wherein the first magnetometer and the second magnetometer are on a survey tool.

Statement 20: The system of any one of statements 16 to 19, wherein the information handling system is located downhole, at surface of the wellbore, or is a combination of a downhole information handling system and an information handling system at the surface.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for determining azimuth while drilling a wellbore comprising:
a bottomhole assembly disposed in the wellbore comprising:
a drill bit;
a first magnetometer for measuring magnetic toolface while drilling;
a second magnetometer for measuring cross-axial magnetic field;
an accelerometer for measuring acceleration to obtain gravity vectors; and
an information handling system, wherein the information handling system is operable to determine an azimuth at a point in the wellbore using at least the magnetic toolface and the measurement of the cross-axial magnetic field, and wherein the information handling system is operable to determine a calibrated cross-axial magnetic field measurement using the measurement of the cross-axial magnetic field from the second magnetometer and magnitude of x- and y-components of a magnetic field as measured by the first magnetometer and the second magnetometer while static.

2. The system of claim 1, wherein the point in the wellbore is at the first magnetometer.

3. The system of claim 1, wherein the information handling system is located downhole on the bottomhole assembly or at surface of the wellbore.

4. The system of claim 1, wherein the first magnetometer and the second magnetometer are on a survey tool.

5. The system of claim 1, wherein the accelerometer is on a survey tool.

6. The system of claim 1, wherein the information handling system determines the azimuth (A) at the point in the wellbore by using equation:

$$A = \tan^{-1}\left(\frac{(Gx*\sin(\alpha) - Gy*\cos(\alpha))*Gz}{\frac{Bz}{Boxy}*(Gx^2 + Gy^2) - Gz*(Gx*\cos(\alpha) + Gy*\sin(\alpha))}\right)$$

wherein Gx, Gy, and Gz are the gravity vectors from a gravitational field measured by the accelerometer, a Boxy parameter is the cross-axial magnetic field measured at the second magnetometer, α is the magnetic toolface measured at the first magnetometer, and Bz is based on Earth's total magnetic field, the measurement of the cross-axial magnetic field, and Earth's local magnetic dip angle.

7. The system of claim 6, wherein the information handling system determines a Boxy ratio when the drill bit is stationary using equation:

$$BoxyRatio = \frac{B'oxy}{\sqrt{X'mag^2 + Y'mag^2}}$$

wherein the first magnetometer measures a magnetic field in an X direction as X'mag and a Y direction as Y'mag, and B'oxy is the cross-axial magnetic field when the drill bit is stationary.

8. The system of claim 7, wherein the information handling system determines a non-static cross-axial magnetic field: B" oxy while the drill bit is rotating into a formation, the first magnetometer measures the magnetic fields in the X and Y directions to yield: a Xmag and a Ymag parameters, the measurements and previous calculation are used in equation:

$$B''oxy = BoxyRatio * \sqrt{Xmag^2 + Ymag^2}$$

wherein the information handling system determines the azimuth (A) using equation:

$$A = \tan^{-1}\left(\frac{(Gx*\sin(\alpha) - Gy*\cos(\alpha))*Gz}{\frac{Bz}{B''oxy}*(Gx^2 + Gy^2) - Gz*(Gx*\cos(\alpha) + Gy*\sin(\alpha))}\right)$$

wherein Gx, Gy, and Gz are the gravity vectors from a gravitational field measured by the accelerometer, a B" oxy was previously calculated, α is the magnetic toolface measured at the first magnetometer, and Bz is based on Earth's total magnetic field, the cross-axial magnetic field measurement, and Earth's local magnetic dip angle.

9. The system of claim 8, wherein the information handling system determines a By and a Bx component at the first magnetometer with equations:

$$Bx = B''oxy * \cos(\alpha) \text{ and } By = B''oxy * \sin(\alpha)$$

wherein α is the magnetic toolface measured at the first magnetometer.

10. A method of drilling a wellbore, comprising:
rotating a drill bit in a subterranean formation;
measuring a magnetic toolface with a first magnetometer while rotating the drill bit;
measuring a cross-axial magnetic field;
determining an azimuth at a first point in the wellbore using at least the magnetic toolface and the cross-axial magnetic field measurement;
determining a calibrated cross-axial magnetic field measurement using the measurement of the cross-axial magnetic field while the drill bit is static from a second magnetometer and magnitude of x- and y-components of a magnetic field as measured by the first magnetometer and the second magnetometer while the drill bit is static; and
using the azimuth to correct drilling operations in the subterranean formation.

11. The method of claim 10, further comprising measuring the cross-axial magnetic field with a second magnetometer while rotating the drill bit.

12. The method of claim 10, wherein the first point is at the first magnetometer.

13. The method of claim 10, further comprising obtaining measurements of gravity vectors with an accelerometer.

14. The method of claim 10, wherein the determining the azimuth at the first point in the wellbore comprises obtaining gravity vectors, calculating an x component of a magnetic field based on the magnetic toolface and the cross-axial magnetic field measurement, calculating a y component of the magnetic field based on the magnetic toolface and the cross-axial magnetic field, calculating a z component of the magnetic field based on Earth's total magnetic field, the cross-axial magnetic field, and Earth's local magnetic dip angle, and calculating the azimuth using the gravity vectors, the x component of the magnetic field, the y component of the magnetic field, and the z component of the magnetic field.

15. The method of claim 10, wherein the determining the azimuth at the point in the wellbore uses equation:

$$A = \tan^{-1}\left(\frac{(Gx*By - Gy*Bx)*Gt}{Bz*(Gx^2 + Gy^2) - Gz*(Gx*Bx + Gy*By)}\right)$$

wherein A is azimuth, wherein Gx, Gy, and Gz are gravity vectors from a gravitational field measured by an accelerometer, wherein Bx and By are magnetic field vectors, and wherein Bz is based on Earth's total magnetic field, the cross-axial magnetic field measurement, and Earth's local magnetic dip angle.

16. The method of claim 10, wherein the cross-axial magnetic field measurement is obtained with a second magnetometer on a survey tool.

17. The method of claim 10, wherein the determining the azimuth is performed downhole, at surface of the wellbore, or a combination thereof.

18. A method of drilling a wellbore, comprising:
rotating a drill bit to extend the wellbore into a subterranean formation;
measuring magnetic toolface with a first magnetometer while rotating the drill bit;
measuring a cross-axial magnetic field with a second magnetometer;
measuring gravity with an accelerometer to obtain gravity vectors; and
determining an azimuth at a first point in the wellbore using at least the magnetic toolface and the cross-axial magnetic field measurement, wherein determining the azimuth at the point in the wellbore uses the following equation:

$$A = \tan^{-1}\left(\frac{(Gx*By - Gy*Bx)*Gt}{Bz*(Gx^2 + Gy^2) - Gz*(Gx*Bx + Gy*By)}\right)$$

wherein A is azimuth, wherein Gx, Gy, and Gz are the gravity vectors from a gravitational field measured by the accelerometer, wherein Bx and By are magnetic field vectors, and wherein Bz is based on Earth's total magnetic field, the cross-axial magnetic field measurement, and Earth's local magnetic dip angle.

19. The method of claim 18, wherein determining the magnetic field vector Bx uses the equation comprises the cross-axial magnetic field measurement of the second magnetometer and the magnetic toolface of the first magnetometer according to the equation:

$$Bx = Boxy * \cos(\alpha) \text{ and } By = Boxy * \sin(\alpha)$$

wherein a Boxy parameter is the cross-axial magnetic field measured at the second magnetometer and wherein α is the magnetic toolface measured at the first magnetometer.

20. The method of claim 18, wherein the point in the wellbore is at the first magnetometer.

* * * * *